(12) United States Patent
Morikawa et al.

(10) Patent No.: US 12,240,251 B2
(45) Date of Patent: Mar. 4, 2025

(54) PRINTING APPARATUS HAVING FIRST HEAD AND SECOND HEAD THAT EJECT INK IN SAME COLOR

(71) Applicant: Brother Kogyo Kabushiki Kaisha, Nagoya (JP)

(72) Inventors: Shota Morikawa, Nagoya (JP); Tomoya Kondo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 177 days.

(21) Appl. No.: 17/656,242

(22) Filed: Mar. 24, 2022

(65) Prior Publication Data

US 2022/0305805 A1    Sep. 29, 2022

(30) Foreign Application Priority Data

Mar. 25, 2021    (JP) .................. 2021-051689

(51) Int. Cl.
    *B41J 2/21*    (2006.01)
(52) U.S. Cl.
    CPC .................. *B41J 2/2103* (2013.01)
(58) Field of Classification Search
    CPC ....................................... B41J 2/2103
    See application file for complete search history.

(56) References Cited

U.S. PATENT DOCUMENTS

| | | | | |
|---|---|---|---|---|
| 5,587,730 A | * | 12/1996 | Karz ............... | B41J 2/16579 347/43 |
| 2005/0068356 A1 | * | 3/2005 | Nambudiri .......... | B41J 13/12 347/14 |
| 2012/0287189 A1 | * | 11/2012 | Shimada ............. | B41J 2/2117 347/12 |
| 2016/0114577 A1 | | 4/2016 | Miyazaki et al. | |
| 2016/0136982 A1 | | 5/2016 | Heath | |

(Continued)

FOREIGN PATENT DOCUMENTS

| | | |
|---|---|---|
| JP | 2006-256185 A | 9/2006 |
| JP | 2012-236358 A | 12/2012 |
| JP | 2015-066836 A | 4/2015 |

(Continued)

OTHER PUBLICATIONS

Office Action issued in corresponding Japanese Application No. 2021-051689,, Oct. 29, 2024.

*Primary Examiner* — Justin Seo
(74) *Attorney, Agent, or Firm* — Merchant & Gould P.C.

(57) ABSTRACT

A printing apparatus includes: first and second heads; a carriage; and a control device. The control device is configured to perform: (a) selecting; (b) setting; and (c) executing. The (a) selecting sets one of the first and second heads as an active head. The (b) setting sets an operation mode to one of a plurality of modes including first and second modes. The (c) executing executes a printing operation under the operation mode. The printing operation is performed by ejecting ink from both the first and second heads in a state where the first mode is set as the operation mode. The printing operation is performed by ejecting ink from the active head without ejecting ink from a non-active head in a state where the second mode is set as the operation mode. The non-active head is a head other than the active head among the first and second heads.

19 Claims, 11 Drawing Sheets

(56) References Cited

U.S. PATENT DOCUMENTS

2016/0257129 A1  9/2016  Ohara

FOREIGN PATENT DOCUMENTS

| JP | 2016-040083 A | 3/2016 |
| JP | 2016-159531 A | 9/2016 |
| JP | 2019-1041 A | 1/2019 |
| JP | 2016-083882 A | 5/2019 |

* cited by examiner

FIG. 2
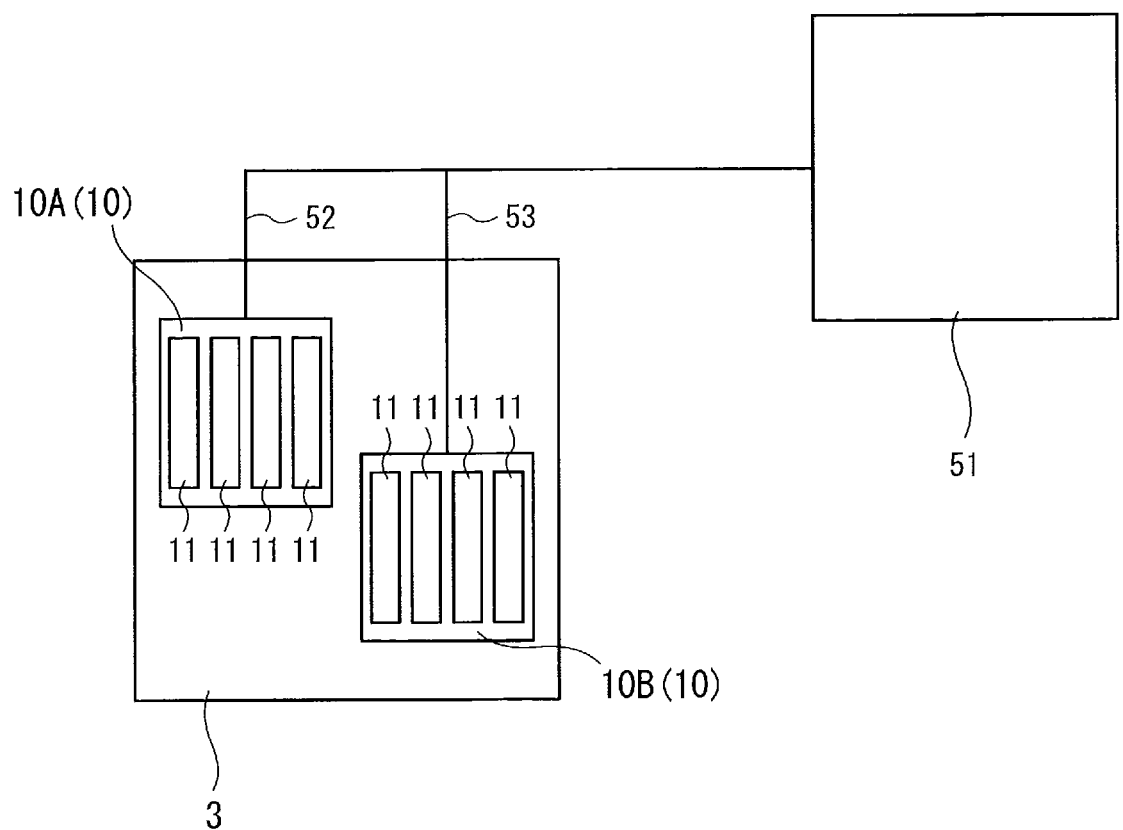
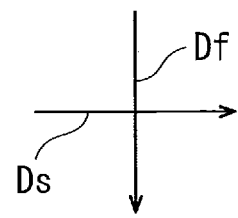

PRINTING APPARATUS HAVING FIRST HEAD AND SECOND HEAD THAT EJECT INK IN SAME COLOR

CROSS REFERENCE TO RELATED APPLICATIONS

This application claims priority from Japanese Patent Application No. 2021-051689 filed Mar. 25, 2021. The entire content of the priority application is incorporated herein by reference.

BACKGROUND

There have been known liquid ejecting devices such as inkjet printers that perform a print on a printing media.

One such liquid ejecting device has a carriage capable of reciprocating in a scanning direction, and a paper feeding mechanism that moves the medium in a conveying direction. The carriage is provided with a first ejection head and a second ejection head. When performing a print, the liquid ejecting device simultaneously moves the carriage in the scanning direction and ejects ink from the ejection heads toward the medium while intermittently conveying the medium in the conveying direction.

The first ejection head and second ejection head are arranged at different positions in the conveying direction of the medium. Thus, in one movement of the carriage, the ejection heads can eject ink over a wide range of the medium in the conveying direction.

SUMMARY

However, ejection heads often have variation in color reproduction owing to manufacturing variations and the like. Consequently, the conventional liquid ejecting device has had difficulty achieving uniform color reproduction with a plurality of ejection heads, making the device unsuitable for image printing that requires high color reproducibility.

In order to attain the above and other objects, the present disclosure provides a printing apparatus including: a first head; a second head; a carriage; a storage device; and a control device. The first head has at least one first nozzle. The at least one first nozzle is configured to eject ink in a first color. The second head has at least one second nozzle. The at least one second nozzle is configured to eject ink in a second color same as the first color. The carriage is configured to support the first head and the second head. The carriage is reciprocally movable in a first direction. The control device is configured to perform: (a) selecting; (b) setting; and (c) executing. The (a) selecting sets one of the first head and the second head as an active head. The (b) setting sets an operation mode to one of a plurality of modes including a first mode and a second mode. The (c) executing executes a printing operation under the operation mode set in the (b) setting. The printing operation is performed by ejecting ink from both the first head and the second head in a state where the first mode is set as the operation mode. The printing operation is performed by ejecting ink from the active head selected in the (a) selecting without ejecting ink from a non-active head in a state where the second mode is set as the operation mode. The non-active head is a head other than the active head among the first head and the second head.

According to the aspect described above, a drop in color reproducibility owing to individual differences in color reproducibility among heads can be prevented.

According to another aspect, the present disclosure also provides a printing method using a printing apparatus. The printing apparatus includes: a first head; a second head; and a carriage. The first head has at least one first nozzle. The at least one first nozzle is configured to eject ink in a first color. The second head has at least one second nozzle. The at least one second nozzle is configured to eject ink in a second color same as the first color. The carriage is configured to support the first head and the second head. The carriage is reciprocally movable. The printing method includes: (a) selecting; (b) setting; and (c) executing. The (a) selecting selects one of the first head and the second head as an active head. The (b) setting sets an operation mode to one of a plurality of modes including a first mode and a second mode. The (c) executing executes a printing operation under the operation mode set in the (b) setting. The printing operation is performed by ejecting ink from both the first head and the second head in a state where the first mode is set as the operation mode. The printing operation is performed by ejecting ink from the active head selected in the (a) selecting without ejecting ink from a non-active head in a state where the second mode is set as the operation mode. The non-active head is a head other than the active head among the first head and the second head.

According to still another aspect, the present disclosure also provides a non-transitory computer-readable storage medium storing a set of computer-readable instructions for a computer in a printing apparatus. The printing apparatus includes: a first head; a second head; and a carriage. The first head has at least one first nozzle. The at least one first nozzle is configured to eject ink in a first color. The second head has at least one second nozzle. The at least one second nozzle is configured to eject ink in a second color same as the first color. The carriage is configured to support the first head and the second head. The carriage is reciprocally movable. The set of computer-readable instructions, when executed by the computer, causes the printing apparatus to perform: (a) selecting; (b) setting; and (c) executing. The (a) selecting selects one of the first head and the second head as an active head. The (b) setting sets an operation mode to one of a plurality of modes including a first mode and a second mode. The (c) executing executes a printing operation under the operation mode set in the (b) setting. The printing operation is performed by ejecting ink from both the first head and the second head in a state where the first mode is set as the operation mode. The printing operation is performed by ejecting ink from the active head selected in the (a) selecting without ejecting ink from a non-active head in a state where the second mode is set as the operation mode. The non-active head is a head other than the active head among the first head and the second head.

The present disclosure can prevent a drop in color reproducibility owing to individual differences in color reproducibility among heads.

BRIEF DESCRIPTION OF THE DRAWINGS

The particular features and advantages of the disclosure as well as other objects will become apparent from the following description taken in connection with the accompanying drawings, in which:

FIG. 2 is a plan view illustrating a sample configuration of heads mounted in a carriage of the printing apparatus shown in FIG. 1 and a mechanism of the printing apparatus that supplies ink to the heads;

DETAILED DESCRIPTION

Figure 1:
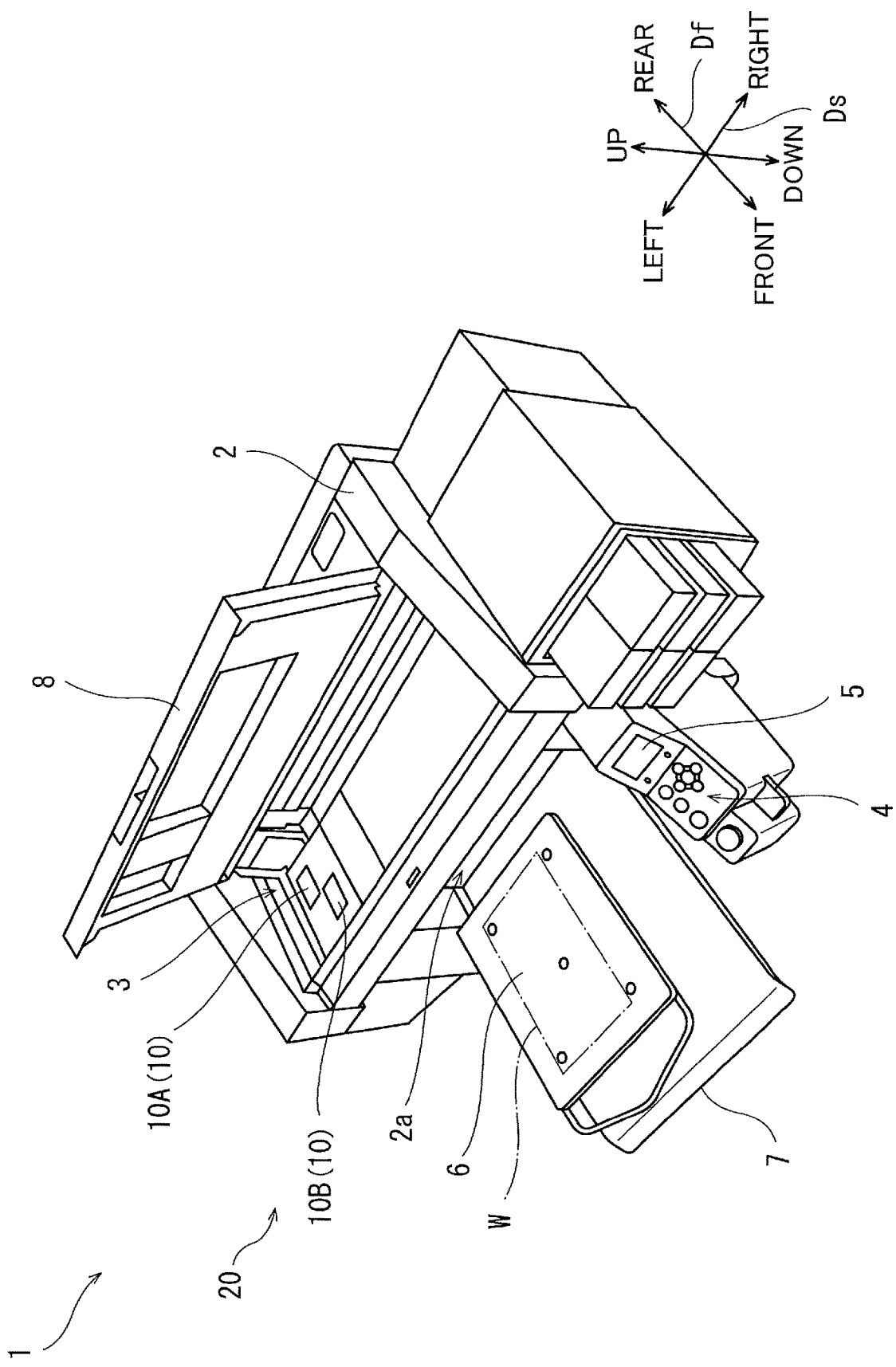
FIG. 1 is a perspective view illustrating a sample configuration of a printing apparatus according to one embodiment.

Next, an embodiment of the present disclosure will be described while referring to the accompanying drawings, but the present disclosure is not limited to the following embodiments. Further, in the following description components in all drawings that are the same or equivalent are designated with the same reference numerals to avoid duplicating description.

The functions of components disclosed in the present specification can be implemented using circuits or processing circuits configured or programmed to execute the disclosed functions, including a general-purpose processor, a dedicated processor, integrated circuits, application-specific integrated circuits (ASICs), conventional circuits, and/or a combination of these. The processors may be treated as processing circuits since they include transistors and other circuits. In this specification, circuits, units, or means are hardware for executing the given functions or hardware programmed to execute the given functions. This hardware may be hardware disclosed in this specification or other known hardware programmed or configured to implement the given functions. In the case of hardware being a processor treated as a type of circuit, the circuit, means, or unit is a combination of hardware and software, and software is used to configure the hardware and/or processor.

FIG. 1 is a perspective view showing a printing apparatus 1 provided with a liquid ejecting device 20 according to one embodiment. Directions indicated in FIG. 1 are an up-down direction, left-right direction, and front-rear direction that are each orthogonal to the others. The left-right direction is also a main scanning direction Ds, and the front-rear direction is also a sub scanning direction Df (equivalent to the conveying direction). Thus, the sub scanning direction Df is orthogonal to the main scanning direction Ds. As an alternative, the sub scanning direction Df may be a direction that crosses the main scanning direction Ds. This printing apparatus 1 is configured to print on a recording medium W. However, the printing apparatus 1 is not only capable of printing on a recording medium W configured of printing paper or the like but is also capable of printing on a non-permeable medium such as a recording medium W formed of a resin or metal material.

As shown in FIG. 1, the printing apparatus 1 according to the present embodiment is provided with a casing 2, operating keys 4, a display/input unit 5, a tray 7, a top cover 8, and the liquid ejecting device 20. In the present embodiment, the liquid ejecting device 20 has a carriage 3, a medium conveying mechanism 9 (see FIG. 3) that includes a stage 6, two ejection heads 10 (a first head 10A and a second head 10B), and a control device 71 (see FIGS. 3 and 4). In the following description, the ejection heads 10 will be simply referred to as heads 10.

FIG. 2 is a plan view showing a sample configuration of the heads 10 mounted in the carriage 3 of the printing apparatus 1, and a mechanism of the printing apparatus 1 that supplies ink to these heads 10. As shown in FIGS. 1 and 2, the first head 10A is provided with a plurality of nozzle rows for ink in the colors yellow (Y), magenta (M), cyan (C), and black (K), for example, often referred to as color ink. These nozzle rows are arranged at regular intervals in the main scanning direction Ds. Each of the nozzle rows includes a plurality of nozzles 11 arranged at regular intervals along the sub scanning direction Df. The nozzles 11 eject ink of the corresponding color. The second head 10B is configured similarly to the first head 10A and has a plurality of nozzles 11 that eject ink of the same colors as the first head 10A. The first head 10A and second head 10B are arranged at different positions from each other in the sub scanning direction Df. For example, the first head 10A is arranged upstream from the second head 10B in the sub scanning direction Df. The first head 10A and second head 10B are arranged such that the downstream ends of nozzle rows in the first head 10A overlap the upstream ends of nozzle rows in the second head 10B in the sub scanning direction Df.

During printing, the printing apparatus 1 controls the first head 10A and second head 10B not to eject ink from some nozzles 11 in order that the dimension in the sub scanning direction Df of a region printed by the first head 10A is equivalent to the dimension in the sub scanning direction Df of the region printed by the second head 10B in one movement of the carriage 3. Specifically, during printing the first head 10A and second head 10B are controlled so that the first head 10A does not eject ink from nozzles 11 in its nozzle rows that are further downstream from nozzles 11 corresponding to the downstream edge of the region being printed by the first head 10A, and so that the second head 10B does not eject ink from nozzles 11 in its nozzle rows that are further upstream of nozzles 11 corresponding to the upstream edge of the region being printed by the second head 10B. This control easily ensures that the dimension in the sub scanning direction Df of the region printed by the first head 10A matches the dimension in the sub scanning direction Df of the region printed by the second head 10B. This control can also prevent a gap from appearing between the region printed by the first head 10A and the region printed by the second head 10B. Further, the first head 10A and second head 10B are detachably provided in the carriage 3 and are replaceable.

The casing 2 is formed in a box shape, for example. The casing 2 has an opening 2a formed in the front surface thereof. The operating keys 4 are provided in a location rightward and forward of the casing 2. The display/input unit 5 is disposed in a position to the rear of the operating keys 4. The operating keys 4 receive operations inputted by the user. The display/input unit 5 is a touchscreen-type display, for example, that displays prescribed information. The display/input unit 5 may also function as operating keys at prescribed timings. The control device 71 implements a print function based on input from the operating keys 4 and display/input unit 5 or external input via a network interface 70 described later and controls displays on the display/input unit 5.

The carriage 3 is configured to be capable of reciprocally moving in the main scanning direction Ds. The heads 10 are supported in the carriage 3. Accordingly, the heads 10 can also reciprocate in the main scanning direction Ds.

The liquid ejecting device 20 has an ink tank 51. The ink tank 51 is disposed outside the carriage 3, for example. The ink tank 51 has an ink tank for each of the colors yellow (Y), magenta (M), cyan (C), and black (K). A first ink tube 52 configured of ink channels for each color connects the ink tank for each color with nozzles 11 in the first head 10A that eject ink of the corresponding color. A second ink tube 53 also configured of ink channels for each color connects the ink tank for each color with nozzles 11 in the second head 10B that eject ink of the corresponding color. The first ink tube 52 and second ink tube 53 are flexible tubes that supply ink from the ink tank 51 to each nozzle to be ejected.

The medium conveying mechanism 9 has the stage 6, which is configured to support the recording medium W. The stage 6 is configured of a rectangular plate member having a prescribed thickness and a longitudinal dimension oriented in the sub scanning direction Df, for example. The medium conveying mechanism 9 conveys the stage 6 in the sub scanning direction Df (i.e., frontward) and in a direction opposite to the sub scanning direction Df (i.e., rearward), and is capable of moving the stage 6 between a printing position at which printing is performed on the recording medium W and a mounting/detaching position for mounting a recording medium W on the stage 6 or removing the recording medium W from the stage 6. In the printing position, the stage 6 opposes the heads 10. In the mounting/detaching position, the stage 6 is outside the casing 2, enabling the recording medium W to be placed on or removed from the stage 6.

Prior to printing, the medium conveying mechanism 9 moves the stage 6 that supports the recording medium W in the direction opposite to the sub scanning direction Df. During printing, the medium conveying mechanism 9 moves the stage 6 in the sub scanning direction Df (i.e., the conveying direction) in order to convey the recording medium W resting on the stage 6 in the conveying direction. When printing is complete, the medium conveying mechanism 9 further moves the stage 6 in the sub scanning direction Df (i.e., the conveying direction) in order to discharge the recording medium W from the opening 2a formed in the front surface of the casing 2.

The tray 7 is provided beneath the stage 6. The tray 7 is configured of a rectangular plate material having a prescribed thickness and a longitudinal dimension oriented in the sub scanning direction Df, for example. When the front edge of the top cover 8 is lifted upward, the top cover 8 is configured to pivot upward about the rotatable base edge, thereby exposing the interior of the casing 2.

Next, other structures of the printing apparatus 1 provided with the liquid ejecting device 20 according to the present embodiment will be described with reference to block diagrams.

Figure 3:
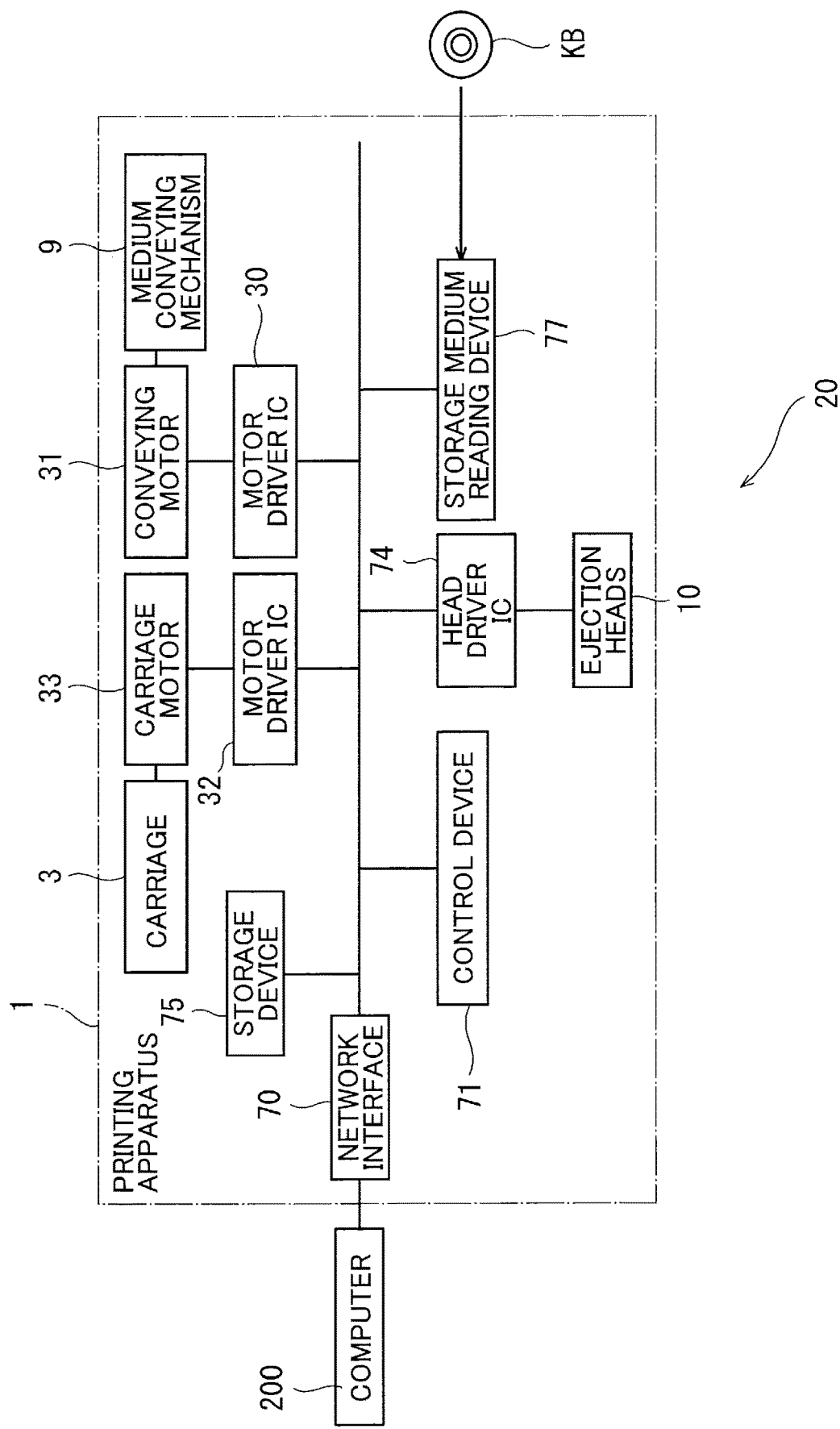
FIG. 3 is a block diagram schematically illustrating a sample configuration of a control system in the printing apparatus shown in FIG. 1.

FIG. 3 is a block diagram schematically showing a sample configuration of the printing apparatus 1. Note that in FIGS. 2 and 15 arrows for the main scanning direction Ds and sub scanning direction Df denote the direction from the upstream side toward the downstream side. In addition to the components described above, the printing apparatus 1 according to the present embodiment is provided with a network interface 70, a control device 71 configured of a CPU and the like, a storage device 75 having a memory such as a RAM and a ROM, a head driver IC 74, a storage medium reading device 77, a conveying motor 31 and 32, a conveying motor 31, and a carriage motor 33, as illustrated in FIG. 3. The conveying motor 31 actuates the stage 6 via the medium conveying mechanism 9. When actuated, the stage 6 conveys the recording medium W in the conveying direction (i.e., the sub scanning direction Df), which is a direction orthogonal to the direction that the carriage 3 moves (i.e., the main scanning direction Ds). The conveying motor 31, stage 6, and medium conveying mechanism 9 are examples of the claimed conveying device. The control device 7 is an example of the claimed computer of the present disclosure.

Figure 4:
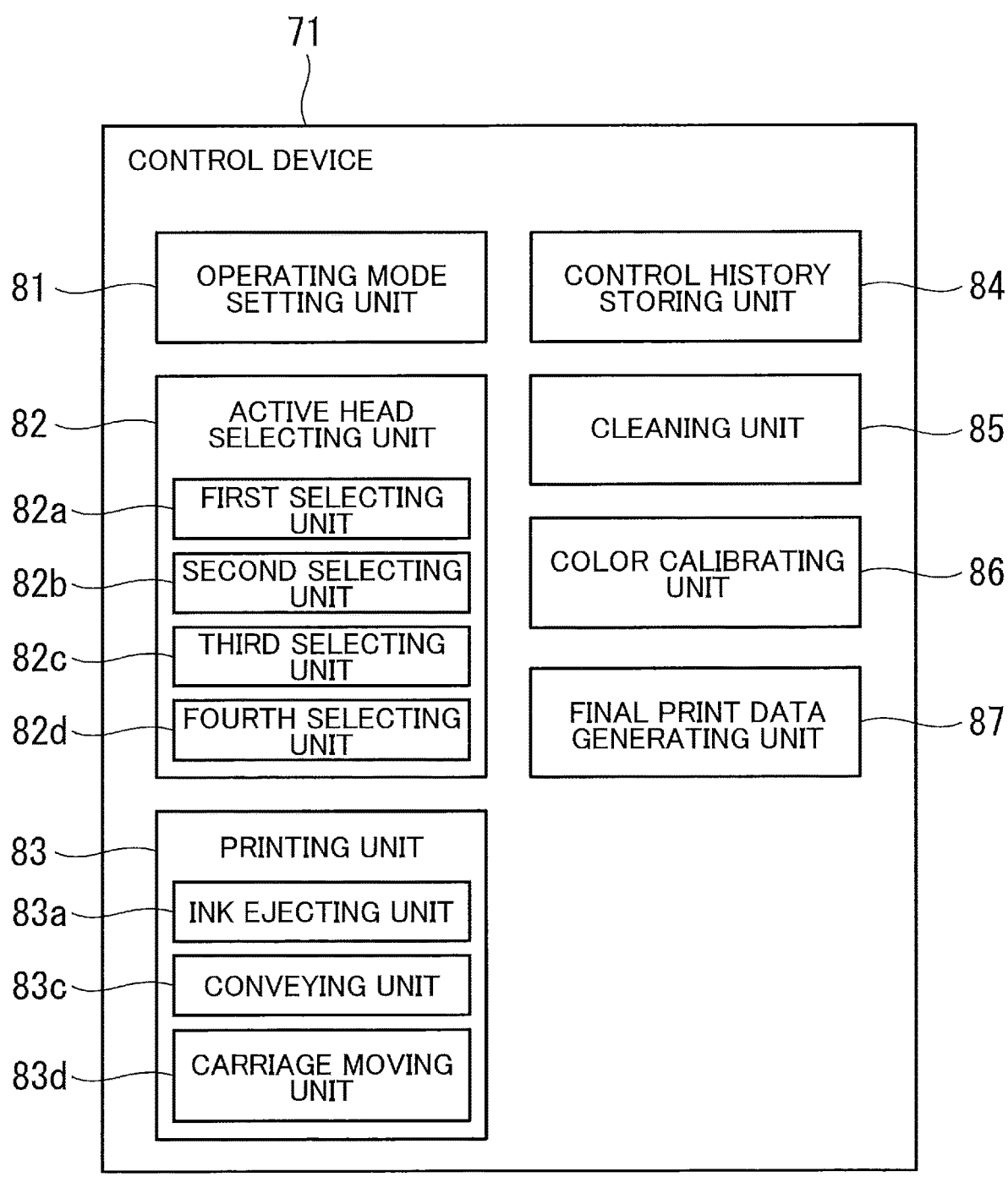
FIG. 4 is a block diagram schematically illustrating a sample configuration of a control device in the printing apparatus shown in FIG. 1.

FIG. 4 is a block diagram schematically illustrating a sample configuration of the control device 71. As its functional configuration, the control device 71 has an operating mode setting unit 81, an active head selecting unit 82, a printing unit 83, a control history storing unit 84, a cleaning unit 85, a color calibrating unit 86, and a final print data generating unit 87. The control device 71 can functionally implement the operating mode setting unit 81, active head selecting unit 82, printing unit 83, control history storing unit 84, cleaning unit 85, color calibrating unit 86, and final print data generating unit 87 described above by executing a prescribed program.

The operating mode setting unit 81 executes an operating mode setting process for setting the operating mode of the printing apparatus 1 to one of a plurality of modes including a first mode and a second mode. The second mode is an operating mode for printing images with higher color reproducibility than in the first mode. For example, the operating mode setting unit 81 stores the current operating mode in the storage device 75. The operating mode setting unit 81 sets the operating mode based on the results of color calibration (described later in greater detail). However, the present disclosure is not limited to this method of setting the operating mode. For example, the operating mode setting unit 81 may set the operating mode to a mode specified in an operating mode selection command inputted by the user on the display/input unit 5 or a computer 200 (described later).

The active head selecting unit 82 executes an active head selection process for selecting one of the first head 10A and second head 10B to be the active head used during the second mode. The active head selecting unit 82 further possesses a first selecting unit 82a that executes a first selection process, a second selecting unit 82b that executes a second selection process, a third selecting unit 82c that executes a third selection process, and a fourth selecting unit 82d that executes a fourth selection process.

The printing unit 83 executes printing processes. The printing unit 83 also has an ink ejecting unit 83a, a conveying unit 83c, and a carriage moving unit 83d.

The ink ejecting unit 83a executes an ejection process for controlling the heads 10 to eject the color inks described above. Specifically, the ink ejecting unit 83a directs the head driver IC 74 to control the operations of actuators in the heads 10 based on raster data for ejecting ink droplets according to the image being formed on the recording medium W. The heads 10 eject color ink under control of the head driver IC 74. When the operating mode is set to the first mode, the ink ejecting unit 83a executes a printing operation by ejecting ink from both the first head 10A and second head 10B. When the operating mode is set to the second mode, the ink ejecting unit 83a executes a printing operation by ejecting ink from the active head while not ejecting ink from the heads 10 other than the active head.

The conveying unit 83c executes a conveying process for driving the conveying motor 31 that actuates the medium conveying mechanism 9 to convey the stage 6 and recording medium W. When the conveying motor 31 is driven, the recording medium W is first conveyed from the downstream side toward the upstream side in the sub scanning direction Df, and then conveyed from the upstream side toward the downstream side in the sub scanning direction Df. When a printing process is executed, conveyance of the recording medium W toward the downstream side in the sub scanning direction is executed alternately with movements of the carriage 3. When the operating mode is set to the first mode, the conveying unit 83c conveys the recording medium W a distance equivalent to the dimension in the sub scanning direction Df of a region printed with two heads 10 (i.e., the first head 10A and second head 10B) during one movement of the carriage 3 (a distance of two heads worth). When the operating mode is set to the second mode, the conveying unit 83c conveys the recording medium W a distance equivalent to the dimension in the sub scanning direction Df of a region printed with one of the first head 10A and second head 10B during one movement of the carriage 3 (a distance of a single head worth).

The carriage moving unit 83d executes a carriage movement process for moving the carriage 3 in the main scanning direction Ds. The carriage 3 is moved in the main scanning direction Ds while the ink ejecting unit 83a performs the ejection process described above. As a result, the heads 10 mounted in the carriage 3 also move in the main scanning direction Ds during the ejection process.

The control history storing unit 84 executes a control history storage process for storing the control history for the first head 10A and second head 10B in the storage device 75. The cleaning unit 85 executes a cleaning process for discharging ink from the nozzles 11. Specifically, the cleaning unit 85 executes a suction process or a flushing process as the cleaning process. In a suction process, the control device 71 first caps the nozzles 11. To cap the nozzles 11 with the control device 71, the carriage 3 is moved until the heads 10 are positioned above the cap, and the cap is raised by a cap raising mechanism, for example. Subsequently, a pump provided in a tube connecting the cap to a waste liquid tank depressurizes the interior of the cap, whereby ink is drawn out from the nozzles 11 into the cap. By discharging ink from the nozzles 11 in this way, the control device 71 can eliminate clogging in the nozzles 11. In a flushing process, the cleaning unit 85 moves the carriage 3 until the heads 10 are positioned above an ink receptacle, and the heads 10 are controlled to eject ink toward the ink receptacle. The discharged ink is conveyed from the ink receptacle to the waste liquid tank.

The color calibrating unit 86 executes a color calibration process for generating a calibration look-up table (LUT). The final print data generating unit 87 selects a calibration LUT corresponding to the recording medium W to be used for a printing operation. Setting information included in a print job specifies the recording medium W. Next, the final print data generating unit 87 creates dot data for each pixel of each ink color from gradation values in print image data included in the print job. The dot data is a halftone, for example, having dot position information and dot size information.

The storage device 75 stores the program of the present embodiment, and a control program for performing various data processing. The storage device 75 also temporarily stores print jobs received from an external personal computer such as a computer 200 or the like via the network interface 70. The storage device 75 also temporarily stores print data for each pass of a printing operation. Note that a pass is an operation for moving the carriage 3 in the main scanning direction Ds and ejecting ink from the heads 10 during this movement. The storage device 75 also stores various data used for selecting the active head in the active head selection process.

The head driver IC 74 receives commands from the control device 71 and controls the heads 10 to eject ink. Similarly, the motor driver IC 30 receives commands from the control device 71 to control the drive of the conveying motor 31 while the motor driver IC 32 receives commands from the control device 71 to control the drive of the carriage motor 33.

The storage medium reading device 77 is a device that reads a liquid ejection program from a computer-readable storage medium KB. The storage medium KB may be a flexible disk, a CD (CD-ROM, CD-R, CD-RW, etc.), a DVD (DVD-ROM, DVD-RAM, DVD-R, DVD+R, DVD-RW, DVD+RW, etc.), a Blu-ray Disc, a magnetic disk, an optical disc, or a magneto-optical disc, for example. The storage medium reading device 77 may also be a device for reading the liquid ejection program from a storage medium such as a USB flash memory. The liquid ejection program read by the storage medium reading device 77 is saved in the storage device 75 and executed by the control device 71. Note that the liquid ejection program of the present embodiment may be received from the computer 200 via the network interface 70 or downloaded from the Internet and may subsequently be saved in the storage device 75.

Next, steps in a printing process executed by the printing apparatus 1 of the present embodiment will be described with reference to flowcharts. The following printing process is performed to print images with high color reproducibility. Therefore, the final print in the printing process is performed after color calibration.

Figure 5:
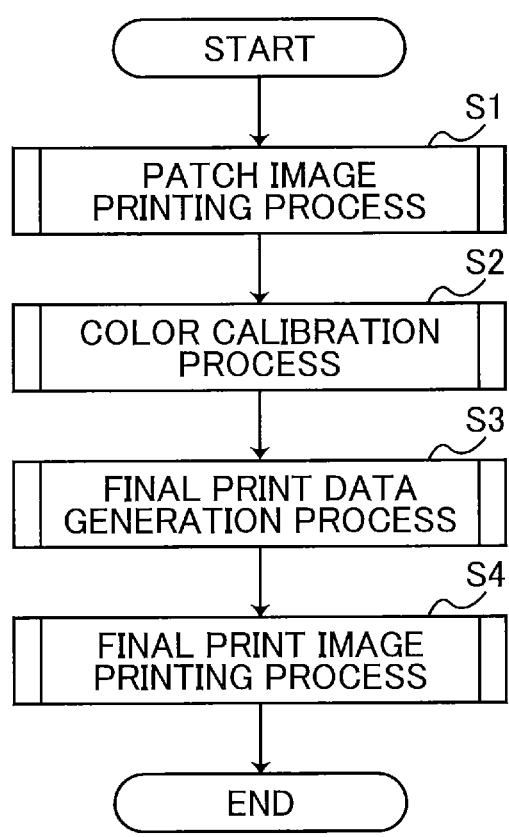
FIG. 5 is a flowchart illustrating sample steps in a printing process executed by the control device in the printing apparatus shown in FIG. 1.
Figure 6:
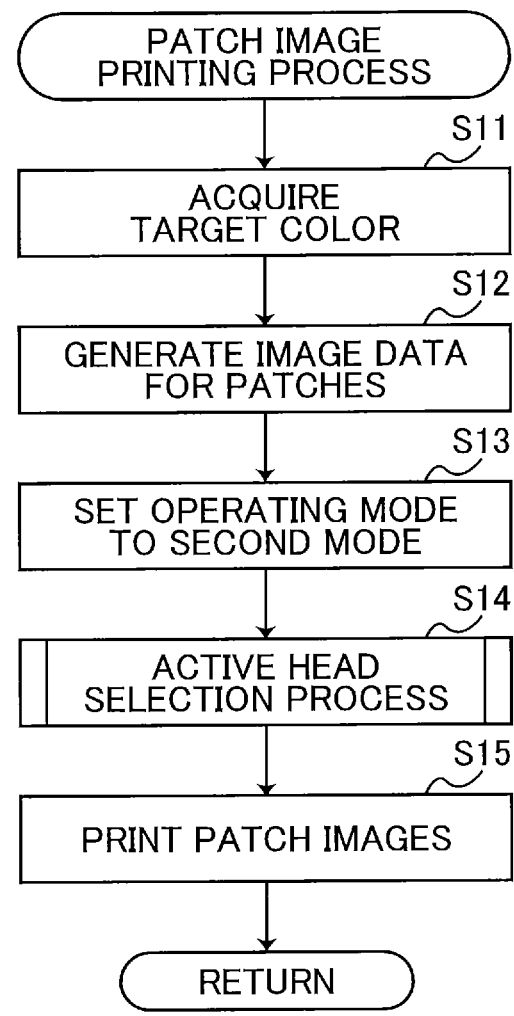
FIG. 6 is a flowchart illustrating sample steps in a patch image printing process executed by the control device in the printing apparatus shown in FIG. 1.

In S1 of FIG. 5, the control device 71 first performs a printing process based on image data for patches, that is, a patch image printing process to print patch images based on the image data for patches. FIG. 6 shows steps in a patch image printing process for performing printing based on image data for patches. In S11 of FIG. 6 the control device 71 receives and acquires a target color to be calibrated via the operating keys 4, display/input unit 5, computer 200 or the like. In S12 the control device 71 generates image data for patches that include a sample of the acquired target color, and samples of a plurality of colors close to the target color obtained by varying parameters of the target color slightly. The image data also associates a patch number with the sample of each color close to the target color. The patch numbers are used for identifying the sample colors.

Figure 7:
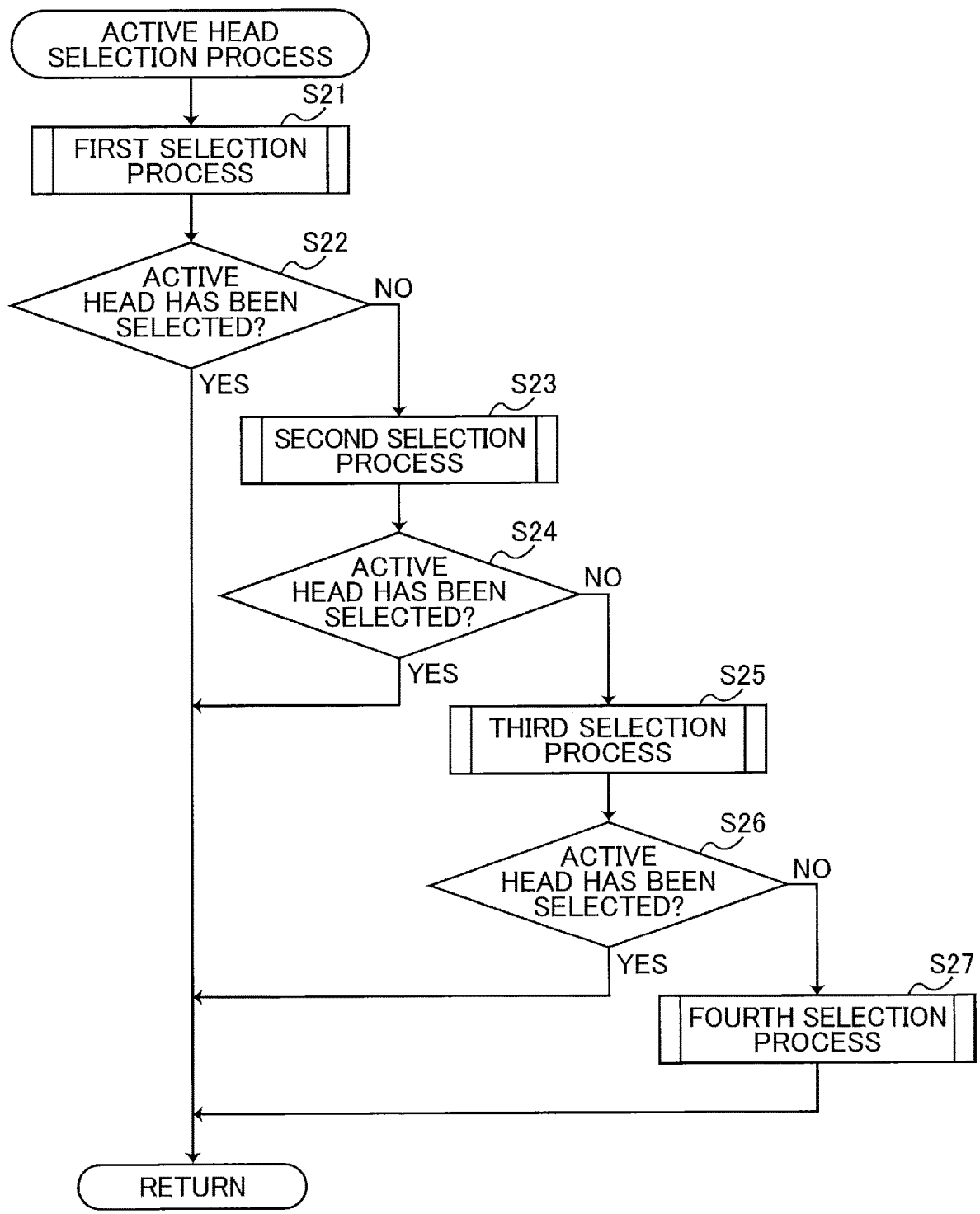
FIG. 7 is a flowchart illustrating sample steps in an active head selection process executed by the control device in the printing apparatus shown in FIG. 1.

In S13 the control device 71 executes an operating mode setting process for setting the operating mode to the second mode. In S14 the control device 71 executes an active head selection process to select one of the first head 10A and second head 10B as the active head to be used in the second mode. In the active head selection process, the control device 71 selects the first head 10A or second head 10B having the most appropriate ejection properties for printing images with the highest color reproducibility. In this process, the control device 71 executes at least one of the first through fourth selection process, as illustrated in FIG. 7. Before continuing with the patch image printing process of FIG. 6, the content of the first through fourth selection processes will be described below.

Figure 8:
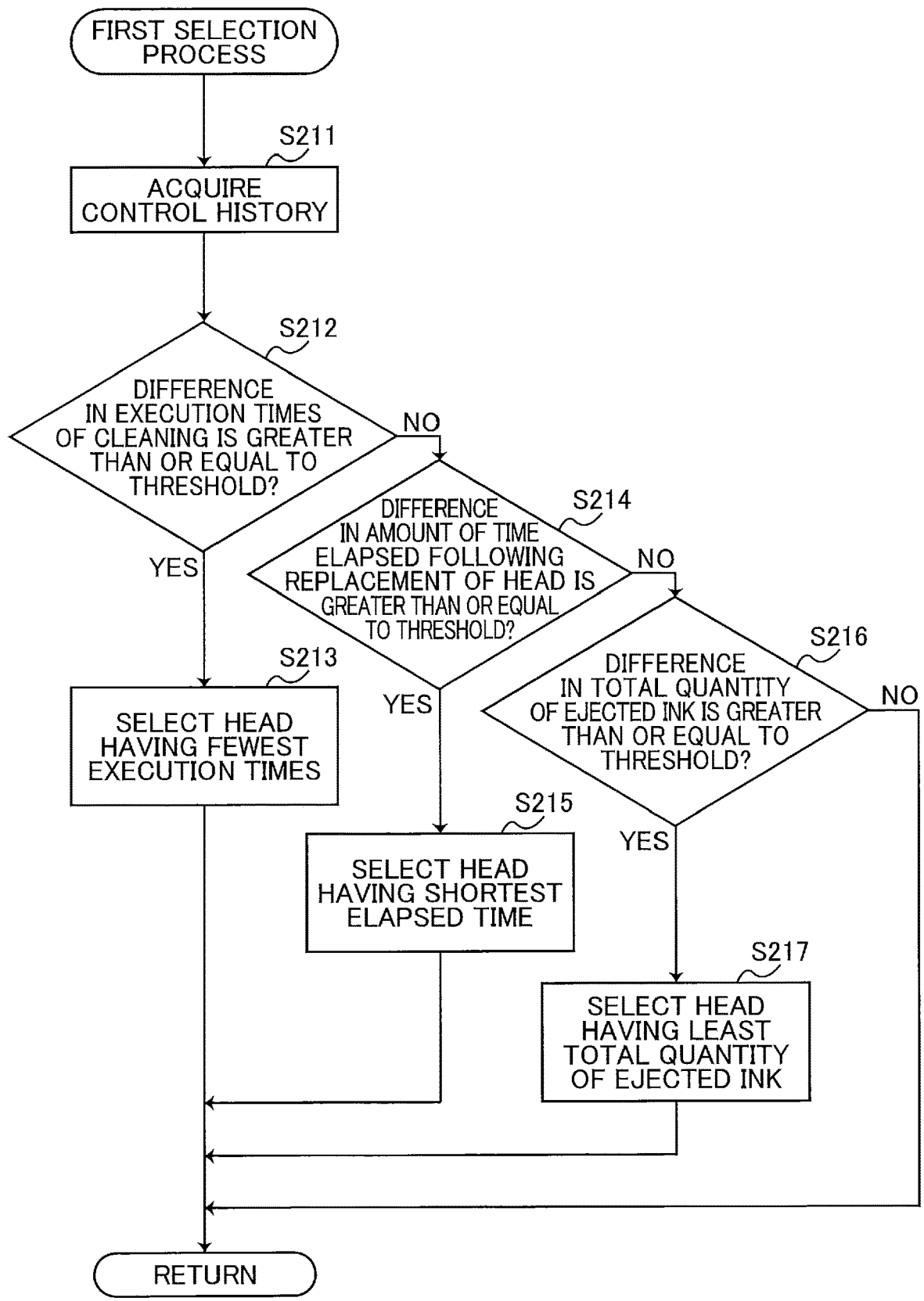
FIG. 8 is a flowchart illustrating sample steps in a first selection process executed by the control device in the printing apparatus shown in FIG. 1.

FIG. 8 shows steps in the first selection process executed by the control device 71 in S21 of FIG. 7. In S211 of FIG. 8, the control device 71 reads and acquires control history for the heads 10 from the storage device 75. The control history for the heads 10 is control history of the control device 71 that has been stored in the storage device 75 by the control history storing unit 84. The control history includes the execution history of cleaning processes, head replacement time information for calculating the length of time that has elapsed after each of the first head 10A and second head 10B was replaced, and total ink ejection quantity information for calculating the total quantity of ink that has been ejected, for example.

Based on the control history for the first head 10A and second head 10B, the control device 71 selects one of the first head 10A and second head 10B as the active head. When selecting one of the first head 10A and second head 10B to be the active head, the control device 71 gives priority to criteria in the following order: the head 10 for which the cleaning process has been executed the fewest number of times, the head 10 for which the least amount of time has elapsed since last being replaced, and the head 10 from which the least total quantity of ink has been ejected.

More specifically, in S212 the control device 71 first determines whether the difference in the number of times the cleaning process has been executed for each head 10 is greater than or equal to a prescribed threshold. If the difference in execution times for the cleaning process between the first head 10A and second head 10B is greater than or equal to the prescribed threshold (S212: YES), in S213 the control device 71 selects the head 10 having the fewest cleaning process execution times to be the active head.

However, if the difference in execution times for the cleaning process is less than the prescribed threshold (S212: NO), in S214 the control device 71 determines whether the difference in the amount of time that has elapsed after each head 10 was replaced is greater than or equal to a prescribed threshold. If the difference in elapsed times following replacement of the heads 10 is greater than or equal to the prescribed threshold (S214: YES), in S215 the control device 71 selects the head 10 having the shortest elapsed time after last being replaced to be the active head.

However, if the difference in the amount of time that has elapsed after each head 10 was replaced is less than the prescribed threshold (S214: NO), in S216 the control device 71 determines whether the difference in the total quantity of ejected ink from each head 10 is greater than or equal to a prescribed threshold. If the difference between total quantities of ejected ink is greater than or equal to the prescribed threshold (S216: YES), in S217 the control device 71 selects the head 10 having the least total quantity of ejected ink to be the active head.

However, if the difference between total quantities of ejected ink is less than the threshold (S216: NO), the control device 71 ends the first selection process without selecting an active head in the first selection process. While the criteria for selecting the active head are not limited to those described in FIG. 8, the active head should be selected based on at least one of execution history for the cleaning process, head replacement time information, and total ink ejection quantity information.

It should be noted that cleaning is primarily executed when a clean command is received from the user due to clogging occurring in the nozzles 11. Hence, a head with a lower cleaning frequency is defined as a head having better ejection properties. Further, since ejection properties of ahead degrade through use, ahead having a shorter elapsed time since its last replacement and a head having the least total quantity of ejected ink is defined as the head having better ejection properties. Accordingly, by selecting an active head based on control history that can affect ejection properties, the control device 71 can select a head with good ejection properties.

Figure 9:
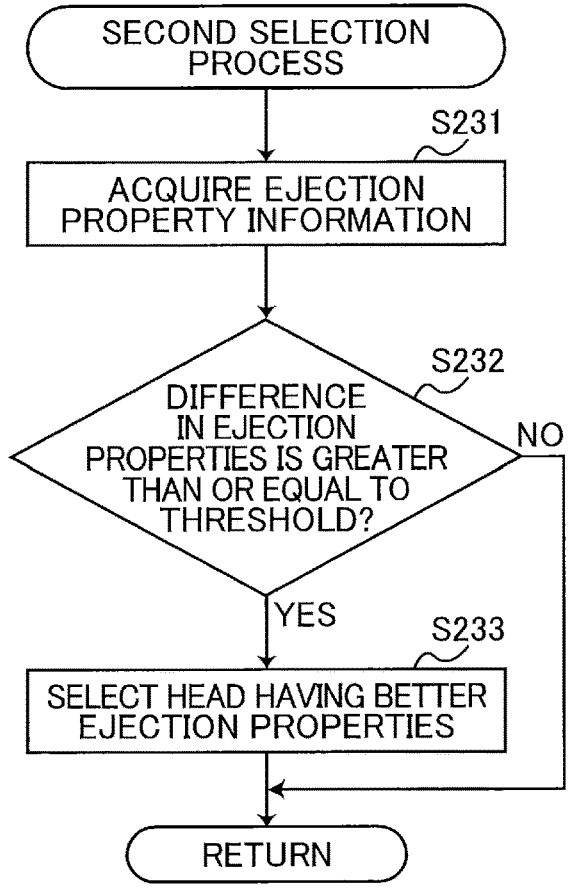
FIG. 9 is a flowchart illustrating sample steps in a second selection process executed by the control device in the printing apparatus shown in FIG. 1.

FIG. 9 shows steps in the second selection process executed by the control device 71 in S23 of FIG. 7. In S231 of FIG. 9, the control device 71 reads and acquires ejection property information from the storage device 75 indicating ink ejection properties for the nozzles 11. This ejection property information indicates variation in the diameters of nozzles 11, for example. Ink ejection properties of the nozzles 11 are measured during manufacturing of the printing apparatus 1 and stored in the storage device 75 as ejection property information.

Next, the control device 71 selects one of the first head 10A and second head 10 to be the active head based on the ejection property information. In other words, in S232 the control device 71 determines whether the difference in ejection properties between the first head 10A and second head 10B is greater than or equal to a prescribed threshold. If the difference in the ejection properties is greater than or equal to the prescribed threshold (S232: YES), in S233 selects the head 10 having better ejection properties to be the active head based on the ejection property information.

Specifically, in S232 the control device 71 determines whether the difference in variation among the diameters of nozzles 11 between the first head 10A and second head 10B is greater than or equal to a prescribed threshold. If the difference in variation among the diameters of nozzles 11 is greater than or equal to the prescribed threshold (S232: YES), in S233 the control device 71 selects the head 10 among the first head 10A and second head 10B having the smallest variation in diameters of nozzles 11 to be the active head, for example. However, if the difference in variation among the diameters of nozzles 11 between the first head 10A and second head 10B is less than the prescribed threshold (S232: NO), the control device 71 ends the second selection process without selecting an active head. As an alternative to the second selection process described above, in S231 the control device 71 may acquire a minimum droplet quantity ejected from the nozzles 11 as the ejection property information, determine in S232 whether this minimum droplet quantity is greater than or equal to a prescribed threshold, and in S232 select the head 10 having the largest minimum droplet quantity ejected from nozzles 11 to be the active head.

Sometimes the drive waveforms applied to actuators in nozzles 11 are adjusted in order to eliminate variation in the size of droplets ejected from nozzles 11 formed in the heads 10. However, if there is a large variation in the diameters of nozzles 11 in a head 10 or if the minimum droplet quantity is small (the smaller droplet quantity requires a larger discharge voltage for the nozzle, which may result in too large droplets from other nozzles), the adjustment range may be insufficient, and the head 10 can be defined as not having good ejection properties. Accordingly, by selecting the active head based on ejection property information indicating ink ejection properties of the nozzles 11, as described above, the control device 71 can select a head 10 having better ejection properties.

Figure 10:
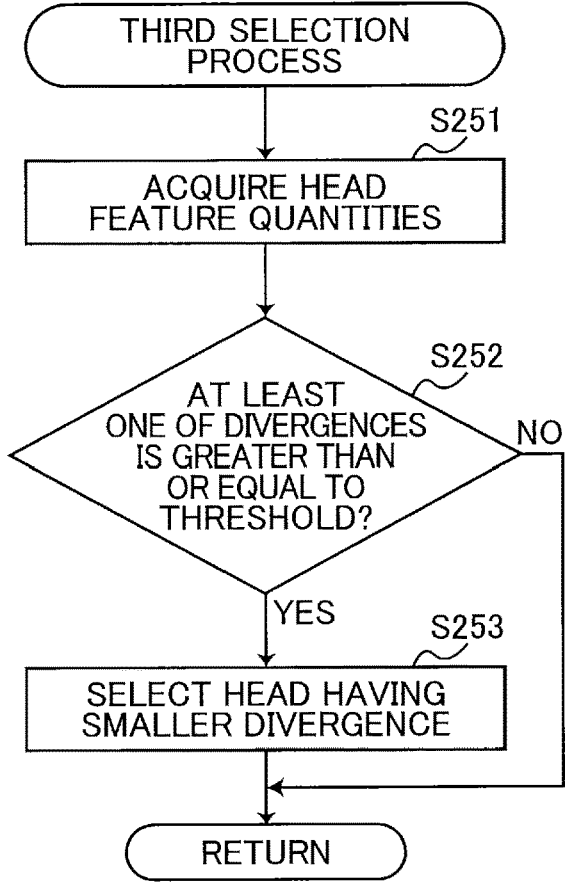
FIG. 10 is a flowchart illustrating sample steps in a third selection process executed by the control device in the printing apparatus shown in FIG. 1.

FIG. 10 shows the third selection process that the control device 71 executes in S25 of FIG. 7. In S251 of FIG. 10, the control device 71 reads and acquires head feature quantities for the first head 10A and second head 10B from the storage device 75. Specifically, in S251 the control device 71 reads and acquires from the storage device 75 a first representative value for a prescribed first feature quantity in the first head 10A, a second representative value for a prescribed second feature quantity in the second head 10B, a first individual value for the first feature quantity in the first head 10A, and a second individual value for the second feature quantity in the second head 10B as the head feature quantities for the first head 10A and second head 10B.

The first feature quantity and second feature quantity may be feature quantities of the same type. In this case, the first representative value and second representative value may be the same value. As a specific example, in the present embodiment, the first feature quantity and second feature quantity are quantities related to the shape of ink channels, and more specifically the diameter of the nozzles 11, the width of ink channels supplying ink to the nozzles 11, or the length of the ink channels. Individual values for these feature quantities are measured during manufacturing of the printing apparatus 1 and stored in the storage device 75. The representative values of these feature quantities are values derived from statistical data such as the mean, median, mode, or design values. The ink channel includes the supply manifold, return manifold, and the plurality of individual channels connected to the supply manifold and return manifold.

Next, the control device 71 selects an active head based on the acquired head feature quantities. Specifically, in S252 the control device 71 determines whether at least one of the divergence of the first individual value from the first representative value and the divergence of the second individual value from the second representative value is greater than or equal to a prescribed threshold. If at least one of the divergences for the first head 10A and second head 10B is greater than or equal to the prescribed threshold (S252: YES), the control device 71 selects the head 10 having the smaller divergence between the individual value and the representative value to be the active head. That is, in S253 the control device 71 selects the first head 10A as the active head when the first individual value has a smaller divergence from the first representative value than the second individual value has from the second representative value; and conversely selects the second head 10B as the active head when the second individual value has a smaller divergence from the second representative value than the first individual value has from the first representative value. Through this process, the control device 71 can select the head 10 having better ejection properties closer to the design values and the like. However, if both the divergence of the first individual value from the first representative value and the divergence of the second individual value from the second representative value are less than the prescribed threshold (S252: NO), the control device 71 ends the third selection process without selecting an active head.

Figure 11:
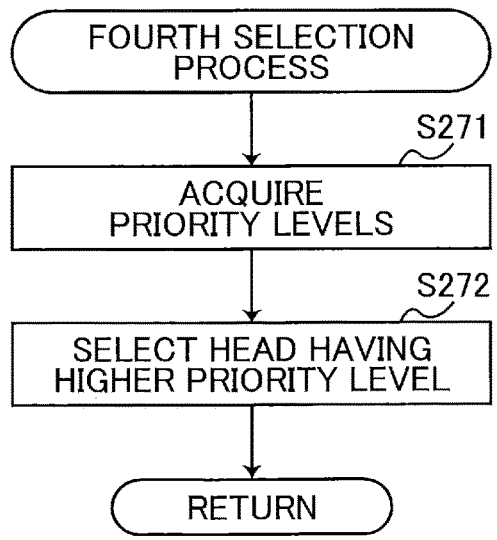
FIG. 11 is a flowchart illustrating sample steps in a fourth selection process executed by the control device in the printing apparatus shown in FIG. 1.

FIG. 11 shows steps in the fourth selection process that the control device 71 executes in S27 of FIG. 7. In S271 of FIG. 11, the control device 71 reads and acquires priority levels from the storage device 75 based on the layout of the first head 10A and second head 10B in the printing apparatus 1. The priority levels are information indicating which head 10 has priority over the other head 10. The priority levels may be preset by the manufacturer of the control device 71 and stored in the storage device 75, for example. These priority levels may be set based on the lengths of the ink tubes, for example. Specifically, when the first ink tube 52 has a shorter length than the second ink tube 53, the priority levels may be set such that the first head 10A has a higher priory level than the second head 10B. Conversely, if the second ink tube 53 has a shorter length than the first ink tube 52, the priority levels may be set such that the second head 10B has a higher priority level than the first head 10A. As an alternative to this method, the priority levels may be set based on the layout of the heads 10 in the conveying direction of the recording medium W. Specifically, the priority levels may be set such that the head 10 among the first head 10A and second head 10B positioned on the upstream side in the conveying direction of the recording medium W has a higher priority level than the other head 10. As another alternative, the priority levels may be set such that the head 10 positioned farther from the opening 2a through which the recording medium W is discharged has a higher priority level than the other head 10. In the present embodiment, the first head 10A is set to have a higher priority level than the second head 10B.

In S272 the control device 71 selects one of the first head 10A and second head 10B to be the active head based on the priority levels. Specifically, in S272 the control device 71 selects the head 10 having a higher priority level to be the active head. Here, the head 10 connected to the ink tank 51 by the shorter ink tube can be defined as a head 10 having good ejection properties since ink can be smoothly supplied to that head 10. Similarly, the head 10 positioned on the upstream side in the conveying direction of the recording medium W can be defined as a head 10 having good ejection properties since this head has fewer opportunities of being used in printing and, hence, has less fatigue. Similarly, the head 10 positioned farthest from the opening 2a through which the recording medium W is discharged can be defined as the head 10 with better ejection properties since this head 10 has fewer opportunities for contacting the recording medium W. Hence, by selecting an active head according to priority levels based on the layout of the first head 10A and second head 10B in the printing apparatus 1, more specifically, by selecting a head 10 having a higher priority level to be an active head, the control device 71 can select the head 10 having better ejection properties.

FIG. 7 shows the active head selection process according to the present embodiment. In this process, the control device 71 uses in order of precedence the first selection process, the second selection process, the third selection process, and the fourth selection process to select an active head. That is, in this active head selection process the control device 71 gives priority to the first selection process over the second selection process for selecting the active head, gives priority to the first selection process over the third selection process for selecting the active head, and gives priority to the first selection process over the fourth selection process for selecting the active head. Also in the active head selection process, the control device 71 gives priority to the second selection process over the third selection process and fourth selection process for selecting the active head and gives priority to the third selection process over the fourth selection process for selecting the active head.

Thus, in S21 of FIG. 7 the control device 71 first executes the first selection process for selecting a head 10 as the active head based on control history. If a head 10 has been selected as the active head in the first selection process (S22: YES), the control device 71 ends the active head selection process. However, if a head 10 was not selected as the active head in the first selection process (S22: NO), in S23 the control device 71 executes the second selection process to select a head 10 as the active head based on ejection property information. If a head 10 has been selected as the active head in the second selection process (S24: YES), the control device 71 ends the active head selection process. However, if a head 10 has not been selected as the active head in the second selection process (S24: NO), in S25 the control device 71 executes the third selection process to select a head 10 as the active head based on head feature quantities. If a head 10 has been selected as the active head in the third selection process (S26: YES), the control device 71 ends the active head selection process. However, if a head 10 has not been selected as the active head in the third selection process (S26: NO), in S27 the control device 71 executes the fourth selection process to select a head 10 as the active head based on priority levels.

In this way, the control device 71 uses the first selection process, second selection process, third selection process, and fourth selection process in this order of priority to select an active head, thereby selecting a suitable head 10 for executing image printing with higher color reproducibility. Note that the control device 71 may select an active head using only one of the first selection process, second selection process, third selection process, and fourth selection process. Alternatively, the control device 71 may select an active head using any plurality of processes from among the first selection process, second selection process, third selection process, and fourth selection process. Here, if the first selection process is used with priority over the second selection process, third selection process, and fourth selection process to select the active head, the control device 71 can select a suitable head 10 for executing image printing with higher color reproducibility. Similarly, if the second selection process is used with priority over the third selection process and fourth selection process to select the active head, the control device 71 can select a suitable head 10 for executing image printing with higher color reproducibility. Further, if the third selection process is used with priority over the fourth selection process to select the active head, the control device 71 can select a suitable head 10 for executing image printing with higher color reproducibility.

After completing the active head selection process described above in S14 of FIG. 6, in S15 the control device 71 executes a printing process for printing patch images based on image data for patches. Since the operating mode has been set to the second mode, as described above, the control device 71 executes a printing process by ejecting ink from the active head while not ejecting ink from heads 10 other than the active head. Subsequently, the control device 71 ends the patch image printing process.

Figure 12:
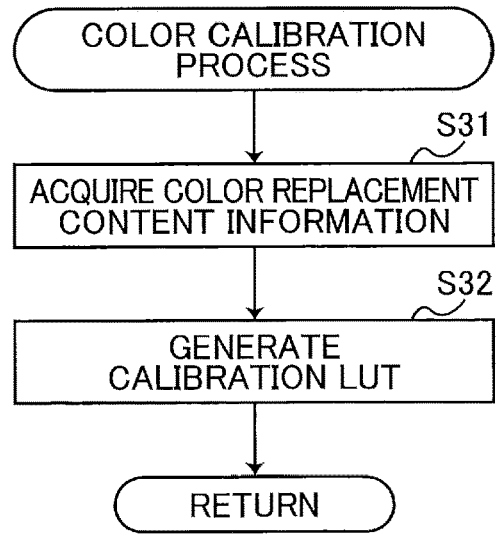
FIG. 12 is a flowchart illustrating sample steps in a color calibration process executed by the control device in the printing apparatus shown in FIG. 1.

Next, in S2 of FIG. 5 the control device 71 executes a color calibration process. FIG. 12 shows steps in the color calibration process. In S31 of FIG. 12, the control device 71 acquires color replacement content information indicating color replacement content. Prior to the control device 71 acquiring this color replacement content information, the user checks the printed matter on which the patch images based on the image data for patches have been printed, and determines whether the target color should be calibrated. When determining that the target color should be calibrated, the user selects one of the calibrated colors from among the plurality of sample colors close to the target color and inputs the patch number corresponding to this sample color into the printing apparatus 1 via the operating keys 4, display/input unit 5, computer 200 or the like. Accordingly, the control device 71 acquires the color replacement content information indicating this color replacement content in S31.

In S32 the control device 71 generates a calibration LUT based on the color replacement content indicated by the acquired color replacement content information. A calibration LUT is data associating input RGB values with output RGB values, for example. In this example, RGB values corresponding to the calibrated color are stored as output RGB values corresponding to the color being calibrated. For colors not being calibrated, the user either does not input values as corresponding output RGB values or the same values as the input RGB values are stored as the output RGB values. The control device 71 sets the input RGB values to the RGB values for the target color being calibrated. Next, the control device 71 identifies RGB values for the selected calibrated color based on the patch number and sets these values as the output RGB values for the target color being calibrated. The control device 71 also calculates output RGB values through interpolation for colors close to the target color being calibrated and associates these calculated values with input RGB values for these colors. Next, the control device 71 stores the generated calibration LUT in the storage device 75 and subsequently ends the color calibration process.

Note that both input and output associated in the calibration LUT need not be limited to RGB values. The input and output associated in the calibration LUT may associate any numerical expressions such as RGB values, CMYK values, LCh values, Lab values, or the like. In the present embodiment, the input and output associated in the calibration LUT are RGB values and CMYK values, respectively. In this case, after calculating output RGB values as described above, the control device 71 converts these output RGB values into CMYK values, and associates the converted CMYK values with the input RGB values to generate calibration LUT. The calibration LUT may store data indicating whether a color corresponding to each input RGB value is a designated replacement color. Next, the control device 71 stores the generated calibration LUT in the storage device 75 and subsequently ends the color calibration process. Note that the designated replacement color is a color designated by the user via the operating keys 4, display/input unit 5, computer 200, or the like.

Figure 13:
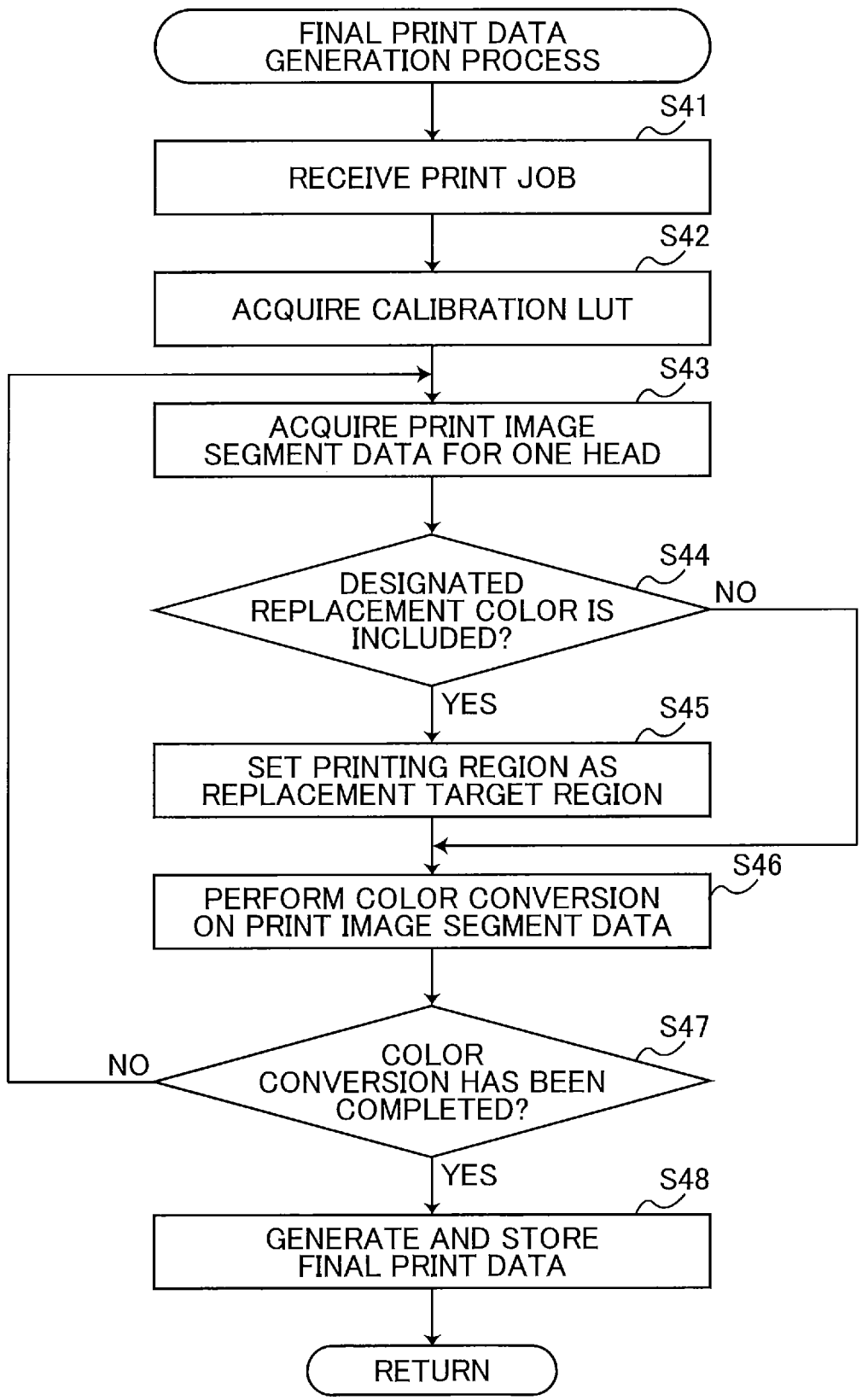
FIG. 13 is a flowchart illustrating sample steps in a final print data generation process executed by the control device in the printing apparatus shown in FIG. 1.

In S3 of FIG. 5, the control device 71 executes a final print data generation process. FIG. 13 shows steps in the final print data generation process. In S41 of FIG. 13, the control device 71 first receives a print job from the computer 200 and stores in the storage device 75. The print job includes image data representing an image to be printed and setting information specifying the recording medium W to be used for printing. In S42 the control device 71 selects and acquires the calibration LUT generated in the color calibration process according to the setting information included in the print job.

Figure 15:
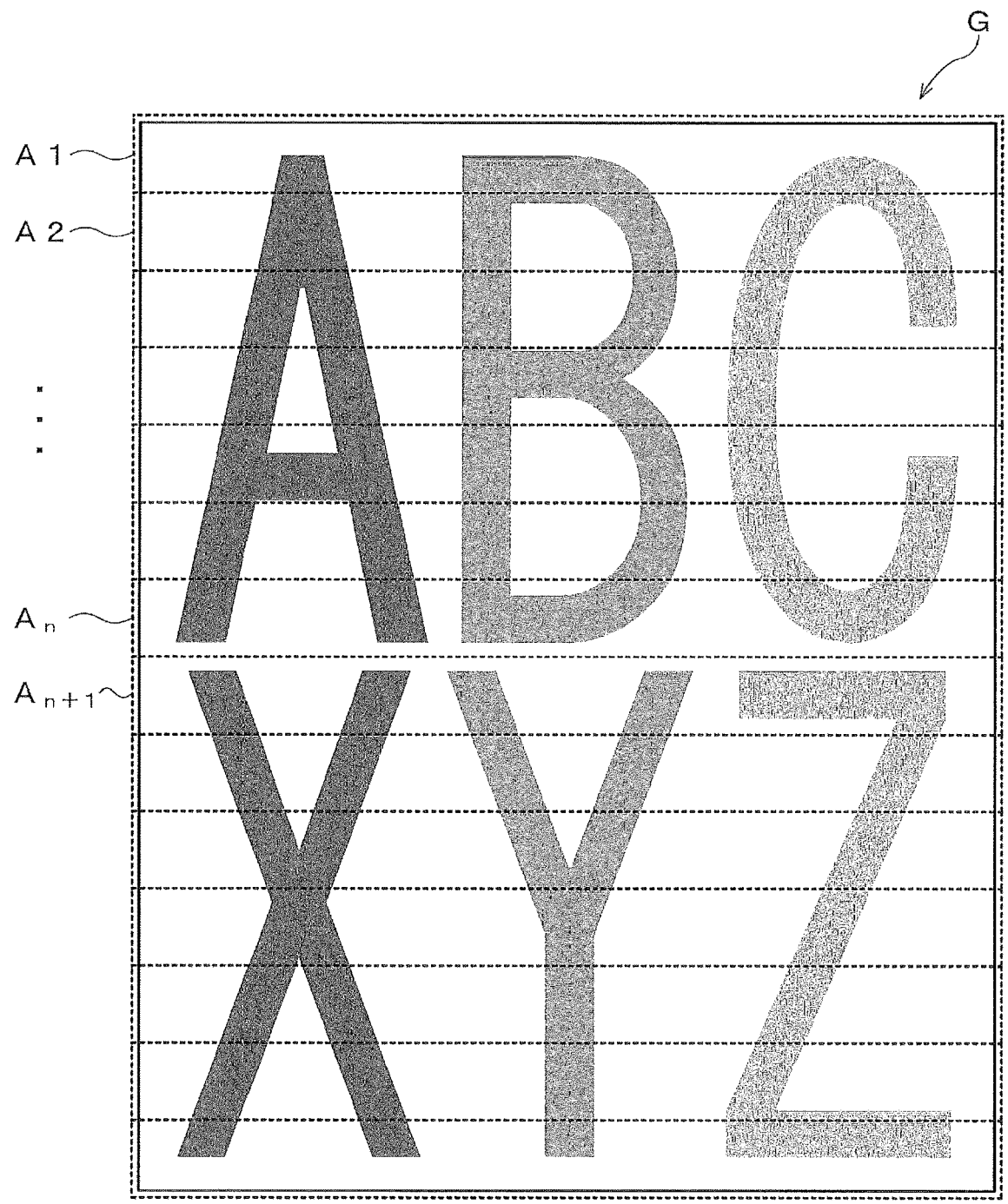
FIG. 15 is an explanatory diagram illustrating an example of a final print image to be printed with the printing apparatus shown in FIG. 1.

In S43 the control device 71 acquires print image segment data for one head. FIG. 15 shows a sample print image G that has been divided into image segments. The control device 71 divides the print image G into image segments along the sub scanning direction Df. Each image segment has a dimension in the sub scanning direction Df equivalent to the region that a single head 10 prints in one movement of the carriage 3 (the dimension of a single head). These image segments will be referred to as printing regions $A_n$ (where n=1, 2, ... ). In S43 the control device 71 acquires print image segment data for one printing region $A_n$ (a single head worth) from among unprocessed printing regions $A_n$ in order beginning from the top of the image and proceeding in the printing order.

In S44 the control device 71 references the calibration LUT to determine whether the acquired print image segment data includes a designated replacement color. If a designated replacement color is included in the segment data (S44: YES), in S45 the control device 71 sets the printing region $A_n$ for this print image segment data as a replacement target region. In S46 the control device 71 performs a color conversion process on the image data included in the print job while referencing the calibration LUT. The control device 71 converts RGB values for each pixel in the printing region $A_n$ into corresponding CMYK values using the calibration LUT. However, if the control device 71 determines in S44 that the print image segment data does not include a designated replacement color (S44: NO), the control device 71 skips S45 and simply performs the color conversion process in S46. In other words, when determining that the print image segment data for the printing region $A_n$ does not include a designated replacement color (S44: NO), the control device 71 converts RGB values for each pixel in the printing region $A_n$ into corresponding CMYK values using the calibration LUT (S45) without setting this printing region $A_n$ as a replacement target region.

In S47 the control device 71 determines whether color conversion has been completed for all print image segment data, i.e., for all image segments configuring the print image G. While color conversion has not been completed (S47: NO), the control device 71 returns to S43 to acquire print image segment data for the next printing region $A_{n+1}$ and repeats the process in S44 through S46 on this data. When color conversion has been completed for all print image segment data (S47: YES), in S48 the control device 71 generates print data based on the results of the color conversion and stores the generated print data as final print data in the storage device 75. Subsequently, the control device 71 ends the final print data generation process.

Figure 14:
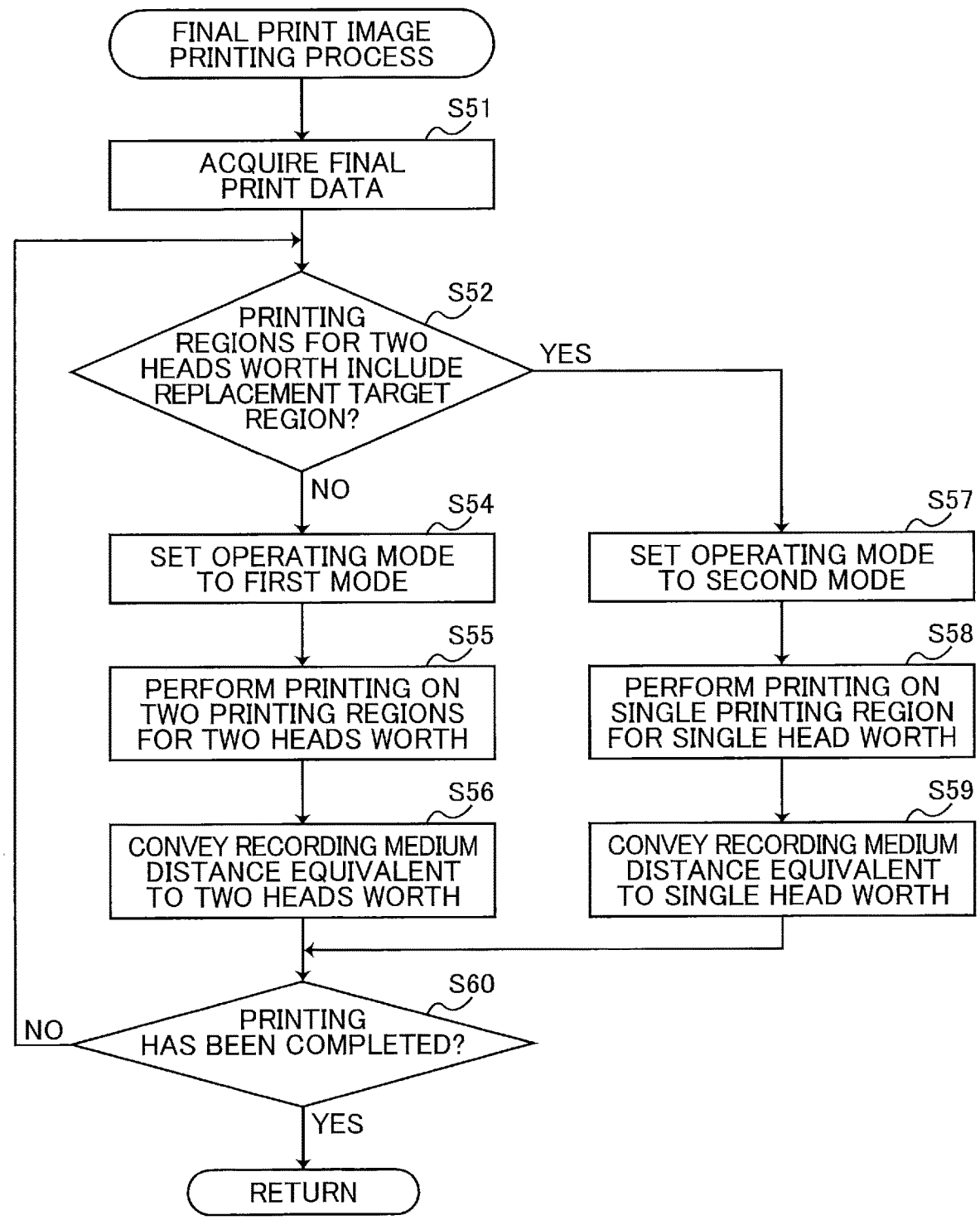
FIG. 14 is a flowchart illustrating sample steps in a final print image printing process executed by the control device in the printing apparatus shown in FIG. 1.

Next, in S4 of FIG. 5 the control device 71 executes a final print image printing process for printing the final print image. FIG. 14 shows steps in the final print image printing process. In S51 of FIG. 14, the control device 71 first acquires the final print data stored in the storage device 75.

In S52 the control device 71 determines whether either one of the printing regions $A_n$ and $A_{n+1}$ (see FIG. 15) for two heads worth of data, beginning from the top of the unprinted data in the sub scanning direction Df and progressing in the printing order, is set as a replacement target region. If neither of the printing regions $A_n$ and $A_{n+1}$ is set as a replacement target region (S52: NO), in S54 the control device 71 executes the operating mode setting process to set the operating mode to the first mode. In S55 the control device 71 executes an ejection process and a carriage movement process in order to perform printing on the printing regions $A_n$ and $A_{n+1}$ corresponding to the data read for two heads worth. As described above, the control device 71 executes a print by ejecting ink from both the first head 10A and second head 10B when the operating mode is set to the first mode. Hence, by moving the carriage 3 once in the main scanning direction Ds, the printing apparatus 1 prints an image equivalent to two heads in the printing regions $A_n$ and $A_{n+1}$. In S56 the control device 71 executes a conveying process to convey the recording medium W downstream in the sub scanning direction Df a distance equivalent to two heads worth of printing just completed.

However, if the control device 71 determines in S52 that at least one of the printing regions $A_n$ and $A_{n+1}$ in the two heads worth of data is set as a replacement target region (S52: YES), in S57 the control device 71 executes the operating mode setting process to set the operating mode to the second mode. In S58 the control device 71 executes an ejection process and a carriage movement process to print the single printing region $A_n$, which is the first printing region of the printing regions $A_n$ and $A_{n+1}$ relative to the printing order, using the active head. Note that when the print image is being printed with the second head 10B, in S59 the control device 71 executes a conveying process to convey the recording medium W so that the printing region $A_n$ is opposing the second head 10B. As described above, the control device 71 executes a print by ejecting ink from the active head and not from heads 10 other than the active head while the operating mode is set to the second mode. Hence, by moving the carriage 3 once in the main scanning direction Ds, the control device 71 prints an image equivalent to a single head in the printing region $A_n$. Next, the control device 71 executes a conveying process to convey the recording medium W downstream in the sub scanning direction Df a distance equivalent to the single head worth of printing just completed.

In S60 the control device 71 determines whether printing has been completed for the entire final print image. While printing is not complete (S60: NO), the control device 71 repeats the process described above from S52. Once printing is complete for the entire final print image (S60: YES), the control device 71 ends the final print image printing process. Through the process described above, regions set as replacement target regions are printed using the active head, while regions not set as replacement target regions are printed using both two heads 10. Accordingly, this method can suppress a reduction in throughput while preventing a drop in color reproducibility owing to individual differences in color reproducibility among heads 10.

As described above, the printing apparatus 1 according to the present embodiment is provided with the first head 10A having nozzles 11 that eject ink, the second head 10B having nozzles 11 that eject ink in the same colors as the first head 10A, a carriage 3 that supports the first head 10A and second head 10B and is capable of reciprocating, the storage device 75, and the control device 71. The control device 71 executes an operating mode setting process for setting the operating mode to one of a plurality of modes that include a first mode, and a second mode for performing image printing with higher color reproducibility than that in the first mode; an active head selection process for selecting one of the first head 10A and second head 10B to be the active head used during the second mode; and a printing process for executing a print by ejecting ink from the first head 10A and second head 10B when the operating mode is set to the first mode and for executing a print by ejecting ink from the active head but not ejecting ink from heads 10 other than the active head when the operating mode is set to the second mode. In this way, the control device 71 can prevent a drop in color reproducibility owing to individual differences in color reproducibility among heads 10.

Variations of the Embodiment

While the description has been made in detail with reference to specific embodiments, it would be apparent to those skilled in the art that many modifications and variations may be made thereto.

In the final print image printing process according to the present embodiment described above, the control device 71 switches the operating mode according to the existence of replacement target regions, but the present disclosure is not limited to this configuration. As an alternative, the user may set the operating mode in print settings, and the control device 71 may switch the operating mode based on this setting.

In the present embodiment described above, the downstream ends of the nozzle rows in the first head 10A overlap the upstream ends of nozzle rows in the second head 10B in the sub scanning direction Df, but the present disclosure is not limited to this configuration. As an alternative, the downstream ends of nozzle rows in the first head 10A may be arranged to be continuous with the upstream ends of nozzle rows in the second head 10B with no overlapping portions in the sub scanning direction Df or may be spaced apart from the upstream ends of nozzle rows in the second head 10B.

The printing apparatus 1 of the present embodiment described above conveys the recording medium W by moving the stage 6 that supports the recording medium W, but the present disclosure is not limited to this method. As an alternative, the printing apparatus 1 may convey the recording medium W with conveying rollers.

In the active head selection process of the present embodiment described above, the control device 71 executes selection processes in order of the first selection process, second selection process, third selection process, and fourth selection process without continuing onto downstream processes once a selection has been made, thereby selecting an active head while giving priority in order of the first selection process, second selection process, third selection process, and fourth selection process. However, the present disclosure is not limited to this method. As an alternative, the control device 71 may execute the first, second, third, and fourth selection processes concurrently or in succession; weight the results of the selection processes with decreasing weights in order of the first selection process, second selection process, third selection process, and fourth selection process; and select an active head based on these weighted results. As an example, the control device 71 gives twice the amount of weight to the active head selected in the first selection process than the active head selected in the second selection process. As another example, the control device 71 gives twice the amount of weight to the active head selected in the first selection process than the active head selected in the third selection process. As another example, the control device 71 gives twice the amount of weight to the active head selected in the first selection process than the active head selected in the fourth selection process. As another example, the control device 71 gives twice the amount of weight to the active head selected in the second selection process than the active head selected in the third selection process. As another example, the control device 71 gives twice the amount of weight to the active head selected in the second selection process than the active head selected in the fourth selection process. As another example, the control device 71 gives twice the amount of weight to the active head selected in the third selection process than the active head selected in the fourth selection process.

The printing apparatus 1 may also be configured to eject UV-curable ink from the heads 10. In this case, the printing apparatus 1 may be provided with an ultraviolet irradiation device that irradiates ultraviolet light toward ink droplets that have impacted the recording medium W.

Numerous modifications and other embodiments of the present disclosure would be apparent to those skilled in the art from the foregoing description. Therefore, the foregoing description should be interpreted only as an example and is provided for the purpose of instructing those skilled in the art of the best mode for carrying out the present disclosure. The structural and/or functional details may be substantially altered without departing from the spirit of the present disclosure.

What is claimed is:

1. A printing apparatus comprising:
   a first head having a plurality of first nozzles, each of the plurality of first nozzles being configured to eject ink in one of a plurality of colors, the plurality of colors including a first color and a second color different from the first color;
   a second head having a plurality of second nozzles, each of the plurality of second nozzles being configured to eject ink in one of the plurality of colors including the first color and the second color;
   a carriage configured to support the first head and the second head, the carriage being reciprocally movable in a first direction;
   a storage device; and
   a control device configured to perform:
      (a) selecting one of the first head and the second head as an active head;
      (b) setting an operation mode to one of a plurality of modes including a first mode and a second mode; and
      (c) executing a printing operation under the operation mode set in the (b) setting,
   wherein the printing operation is performed by ejecting ink in the plurality of colors from both the first head and the second head in a state where the first mode is set as the operation mode, and
   wherein the printing operation is performed by ejecting ink in the plurality of colors from the active head selected in the (a) selecting without ejecting ink from a non-active head in a state where the second mode is set as the operation mode, the non-active head being a head other than the active head among the first head and the second head.

2. A printing apparatus comprising:
   a first head having at least one first nozzle configured to eject ink in a first color;
   a second head having at least one second nozzle configured to eject ink in a second color same as the first color;
   a carriage configured to support the first head and the second head, the carriage being reciprocally movable in a first direction,
   a storage device; and
   a control device configured to perform,
      (a) selecting one of the first head and the second head as an active head;
      (b) setting an operation mode to one of a plurality of modes including a first mode and a second mode;

(c) executing a printing operation under the operation mode set in the (b) setting, and (d) storing a control history for the first head and the second head in the storage device, wherein the printing operation is performed by ejecting ink from both the first head and the second head in a state where the first mode is set as the operation mode, wherein the printing operation is performed by ejecting in from the active head selected in the (a) selecting without ejecting ink from a non-active head in a state where the second mode is set as the operation mode, the non-active head being a head other than the active head among the first head and the second head; and wherein the (a) selecting comprises:
(a-1) selecting the active head based on the control history.

3. The printing apparatus according to claim 2, wherein the first head and the second head are detachably provided in the carriage, wherein the control device is configured to further perform:
(e) executing a cleaning process for the first head and the second head by discharging ink from the at least one first nozzle and the at least one second nozzle, wherein the control history includes an execution history of the cleaning process for each of the first head and the second head, head replacement time information for calculating an elapsed time duration elapsed following replacement of each of the first head and the second head, and total ink ejection quantity information for calculating a total ink ejection quantity from each of the first head and the second head, wherein the (a-1) selecting comprises:
(a-1-1) selecting the active head based on the execution history, the cleaning process having been executed a fewer number of times for the active head than for the non-active head;
(a-1-2) selecting the active head based on the head replacement time information, the elapsed time duration calculated for the active head being shorter than the elapsed time duration calculated for the non-active head; and
(a-1-3) selecting the active head based on the total ink ejection quantity information, the total ink ejection quantity calculated for the active head being less than the total ink ejection quantity calculated for the non-active head, and wherein the selecting based on the execution history is prioritized than the selecting based on the head replacement time information, and the selecting based on the head replacement time information is prioritized than the selecting based on the total ink ejection quantity information.

4. The printing apparatus according to claim 1, wherein the storage device is configured to store ejection property information indicating an ink ejection property for each of the plurality of first nozzles in the first head and the plurality of second nozzles in the second head, and wherein the (a) selecting comprises:
(a-2) selecting the active head based on the ejection property information.

5. The printing apparatus according to claim 4, wherein the plurality of first nozzles have respective ones of a plurality of first diameters, and the plurality of second nozzles have respective ones of a plurality of second diameters, wherein the ejection property information for the first head indicates variation in the plurality of first diameters, and the ejection property information for the second head indicates variation in the plurality of second diameters, and wherein the variation indicated by the ejection property information for the active head is less than the variation indicated by the ejection property information for the non-active head.

6. The printing apparatus according to claim 4, wherein the ejection property information for the first head indicates a minimum droplet quantity ejected from the plurality of first nozzles, and the ejection property information for the second head indicates a minimum droplet quantity ejected from the plurality of second nozzles, and wherein the minimum droplet quantity indicated by the ejection property information for the active head is greater than the minimum droplet quantity indicated by the ejection property information for the non-active head.

7. The printing apparatus according to claim 1, wherein the storage device is configured to store head feature quantity information indicating a head feature quantity for each of the first head and the second head, and wherein the (a) selecting comprises:
(a-3) selecting the active head based on the head feature quantity information.

8. The printing apparatus according to claim 7, wherein the head feature quantity information includes a representative value and an individual value for the head feature quantity for each of the first head and the second head, and wherein the (a-3) selecting comprises:
(a-3-1) acquiring a divergence of the individual value from the representative value for each of the first head and the second head; and
(a-3-2) selecting the active head based on the divergence, the divergence of the active head being smaller than the divergence of the non-active head.

9. The printing apparatus according to claim 7, wherein the first head has a first ink channel supplying ink to each of the plurality of first nozzles, and the second head has a second ink channel supplying ink to each of the plurality of second nozzles, and wherein the head feature quantity for the first head includes a diameter of each of the plurality of first nozzles, a width of the first ink channel, and a length of the first ink channel, and the head feature quantity for the second head includes a diameter of each of the plurality of second nozzles, a width of the second ink channel, and a length of the second ink channel.

10. A printing apparatus comprising:
a first head having at least one first nozzle configured to eject ink in a first color,
a second head having at least one second nozzle configured to eject ink in a second color same as the first color;
a carriage configured to support the first head and the second head, the carriage being reciprocally movable in a first direction,
a storage device; and
a control device configured to perform:
(a) selecting one of the first head and the second head as an active head,
(b) setting an operation mode to one of a plurality of modes including a first mode and a second mode; and (c) executing a printing operation under the operation mode set in the (b) setting,
where the printing operation is performed by ejecting ink from both the first head and the second head in a state where the first mode is set as the operation mode,
wherein the pruning operation is performed by ejecting ink from the active head selected in the (a) selecting without ejecting ink from a non-active head in a state where the second mode is set as the operation mode, the non-active head being a head other than the active head among the first head and the second head,
wherein the storage device is configured to store priority level information indicating a priority level of each of the first head and the second head based on a layout of the first head and the second head in the printing apparatus, and
wherein the (a) selecting comprises:
(a-4) selecting the active head based on the priority level information, the priority level of the active head indicated by the priority level information being higher than the priority level of the non-active head indicated by the priority level information.

11. The printing apparatus according to claim 10, further comprising:
an ink tank;
a first ink tube configured of an ink channel between the ink tank and the first head, the first ink tube having a first length; and
a second ink tube configured of an ink channel between the ink tank and the second head, the second ink tube having a second length,
wherein the priority level of the first head indicated by the priority level information is higher than the priority level of the second head indicated by the priority level information in a case where the first length is shorter than the second length, and
wherein the priority level of the second head indicated by the priority level information is higher than the priority level of the first head indicated by the priority level information in a case where the second length is shorter than the first length.

12. The printing apparatus according to claim 10, further comprising:
a casing formed with an opening; and
a conveying device configured to convey a recording medium in a second direction to discharge the recording medium through the opening, the second direction crossing the first direction,
wherein the first head is arranged at a first position in the second direction, and the second head is arranged at a second position different from the first position in the second direction,
wherein the priority level of the first head indicated by the priority level information is higher than the priority level of the second head indicated by the priority level information in a case where the first position is upstream in the second direction from the second position, and
wherein the priority level of the second head indicated by the priority level information is higher than the priority level of the first head indicated by the priority level information in a case where the second position is upstream in the second direction from the first position.

13. The printing apparatus according to claim 10, further comprising:
a casing formed with an opening; and
a conveying device configured to convey a recording medium in a second direction to discharge the recording medium through the opening, the second direction crossing the first direction,
wherein the first head is arranged at a first position in the second direction, and the second head is arranged at a second position different from the first position in the second direction,
wherein the priority level of the first head indicated by the priority level information is higher than the priority level of the second head indicated by the priority level information in a case where the first position is farther from the opening than the second position is from the opening, and
wherein the priority level of the second head indicated by the priority level information is higher than the priority level of the first head indicated by the priority level information in a case where the second position is farther from the opening than the first position is from the opening.

14. The printing apparatus according to claim 1, wherein the storage device is configured to store ejection property information indicating an ink ejection property for each of the plurality of first nozzles in the first head and the plurality of second nozzles in the second head,
wherein the control device is configured to further perform:
(d) storing a control history for the first head and the second head in the storage device, wherein the (a) selecting comprises:
(a-1) selecting the active head based on the control history; and
(a-2) selecting the active head based on the ejection property information, and
wherein the selecting based on the control history is performed prior to the selecting based on the ejection property information.

15. The printing apparatus according to claim 1, wherein the storage device is configured to store head feature quantity information indicating a head feature quantity for each of the first head and the second head,
wherein the control device is configured to further perform:
(d) storing a control history for the first head and the second head in the storage device, wherein the (a) selecting comprises:
(a-1) selecting the active head based on the control history; and
(a-2) selecting the active head based on the head feature quantity information, and
wherein the selecting based on the control history is performed prior to the selecting based on the head feature quantity information.

16. The printing apparatus according to claim 1, wherein the storage device is configured to store priority level information indicating a priority level of each of the first head and the second head based on a layout of the first head and the second head in the printing apparatus,
wherein the control device is configured to further perform:
(d) storing a control history for the first head and the second head in the storage device, wherein the (a) selecting comprises:
(a-1) selecting the active head based on the control history; and
(a-2) selecting the active head based on the priority level information, and wherein the selecting based on the control history is performed prior to the selecting based on the priority level information.

17. The printing apparatus according to claim 1, wherein the storage device is configured to store ejection property information indicating an ink ejection property for each of the plurality of first nozzles in the first head and the plurality of second nozzles in the second head, and head feature quantity information indicating a head feature quantity in each of the first head and the second head,
  wherein the (a) selecting comprises:
    (a-1) selecting the active head based on the ejection property information; and
    (a-2) selecting the active head based on the head feature quantity information, and
  wherein the selecting based on the ejection property information is performed prior to the selecting based on the head feature quantity information.

18. The printing apparatus according to claim 1, wherein the storage device is configured to store ejection property information indicating an ink ejection property for each of the plurality of first nozzles in the first head and the plurality of second nozzles in the second head, and priority level information indicating a priority level of each of the first head and the second head based on a layout of the first head and the second head in the printing apparatus,
  wherein the (a) selecting comprises:
    (a-1) selecting the active head based on the ejection property information; and
    (a-2) selecting the active head based on the priority level information, and
  wherein the selecting based on the ejection property information is performed prior to the selecting based on the priority level information.

19. The printing apparatus according to claim 1, wherein the storage device is configured to store head feature quantity information indicating a head feature quantity for each of the first head and the second head, and priority level information indicating a priority level of each of the first head and the second head based on a layout of the first head and the second head in the printing apparatus,
  wherein the (a) selecting comprises:
    (a-1) selecting the active head based on the head feature quantity information; and
    (a-2) selecting the active head based on the priority level information, and
  wherein the selecting based on the head feature quantity information is performed prior to the selecting based on the priority level information.

* * * * *